J. Herbert,
Plow,
Nº 3,538.    Patented Apr. 13, 1844.
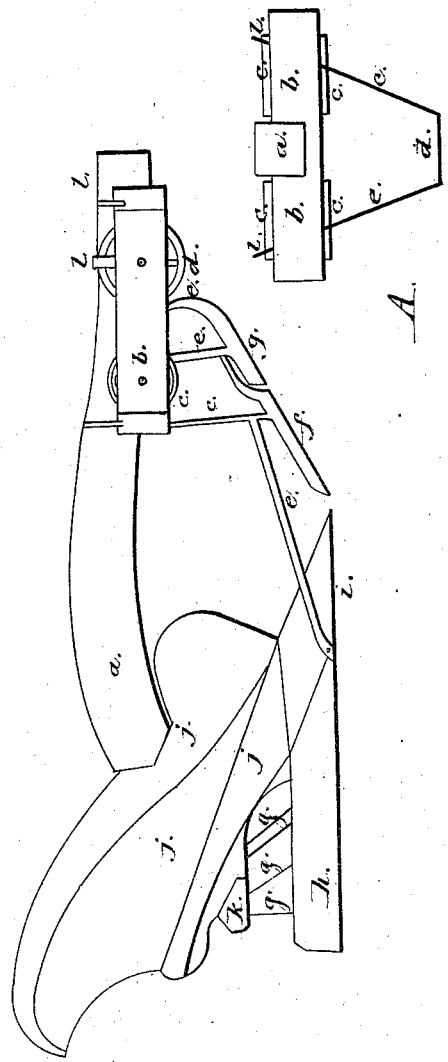

UNITED STATES PATENT OFFICE.

JAMES HERBERT, OF LAGRANGE COUNTY, INDIANA.

IMPROVEMENT IN PLOWS FOR EXCAVATING DITCHES.

Specification forming part of Letters Patent No. 3,538, dated April 13, 1844.

*To all whom it may concern:*

Be it known that I, JAMES HERBERT, of Lagrange county, Indiana, have invented a new and useful Improvement in Ditching-Plows for Ditching in Marshes and Wet Grounds, commonly called the "Complete Ditcher," for which a patent was issued to Horace Cleveland, of the State of Indiana, and also in the ditching-plow for which a patent was issued to Cromwell R. Bartlett, of Illinois; and I do hereby declare that the following is a full and exact description thereof.

It consists of a beam, bed-piece, posts, mold-board, cross-pieces to support mold-board, frame under the beam, share to cut the bottom of the ditch, braces to support the knives, knives to cut the sides of the ditch, two wheels, sharp on the edges, rolling and cutting the sod at a depth proportioned to the size of the wheels, and if made sufficiently large cutting the sod and earth to the bottom of the ditch, enabling the operator (if he please) to proceed without the use of the knives, rollers, and strips of iron from the top of the beam, frame to the beam, as will appear on reference to the drawing annexed, (marked A,) wherein—

$a$ represents the beam; $h$, bed-piece; $s\ s\ s$, posts to support the beam, bed-piece, and mold-board; $k$, cross-piece to support mold-board; $b$, frame under the beam; $c$, roller to roll on the surface; $d$, wheel to cut the sod; $e\ e\ e$, braces to support the knives; $ff$, knives to cut the sides of the ditch; $i$, share to cut the bottom of the ditch; $j\ j\ j$, mold-board; $k$, cross-piece to support mold-board; $l\ l\ l$, strips of iron from the top of the frame to the beam— with an end view of the said plow in the margin of said drawing.

The chief advantage of the rotating wheels, which are made to slope with the knives from a vertical position at any angle which the constructer of the machine may select, consists in this, that with large wheels you may dispense with the knives, and when used with the knives they aid the passage of the machine over obstructions and uneven sod, which they also assist in cutting, (the edges being made sharp for that purpose,) and prevent the knives from shoving the earth forward and from choking in soft marsh, which happens with other machines. The wheels are two in number.

The knives constituting the remaining part of my improvement are two in number. Each knife consists of two or more parts, which fit into each other, one being convex and the other concave. The knives are supported by the braces above referred to, the first part of the knife representing a convex section, and supported by having one end near the most crooked part fastened into the frame of the machine, thence rounded, with the edge in a convex shape, like the anterior part of a sleigh-shoe, until you arrive at half, or about half, the proposed length of your whole knife, more or less, as you choose. Then secure or fasten this part of your knife at the last-named point by a vertical brace fastened to the knife and the frame, make the other part of your knife fit the part above referred to, and fasten by a vertical brace, as before. In the same manner each of the knives may be divided into as many parts as may be desired. These knives slope inward, as do the wheels, and fix the slope of the ditch. The wheels run in separate gudgeons fastened into the forward end of the frame before the knives, as in the drawing.

What I claim, and desire to secure by Letters Patent, is—

The employment of rotating cutter-wheels attached to the forward end of the frame in the machine referred to, for cutting the earth and sod, as described above, in combination with the said plow and side cutters, and the side cutters consisting of two or more parts each, as above described, and connected together, for the purpose and in the manner above mentioned.

JAMES HERBERT.

Witnesses:
JOHN B. HOWE,
JAMES B. HOWE, Jr.